United States Patent
Flynn

(10) Patent No.: US 7,236,253 B2
(45) Date of Patent: Jun. 26, 2007

(54) OPTICAL METHOD MEASURING THIN FILM GROWTH

(75) Inventor: Colin James Flynn, Malvern (GB)

(73) Assignee: Qinetiq Limited (GB)

( * ) Notice: Subject to any disclaimer, the term of this patent is extended or adjusted under 35 U.S.C. 154(b) by 296 days.

(21) Appl. No.: 10/489,497

(22) PCT Filed: Sep. 13, 2002

(86) PCT No.: PCT/GB02/04179

§ 371 (c)(1),
(2), (4) Date: Mar. 12, 2004

(87) PCT Pub. No.: WO03/025496

PCT Pub. Date: Mar. 27, 2003

(65) Prior Publication Data

US 2004/0239953 A1    Dec. 2, 2004

(30) Foreign Application Priority Data

Sep. 14, 2001    (GB) .................................. 0122197.7

(51) Int. Cl.
*G01J 3/45* (2006.01)
(52) U.S. Cl. ..................... 356/504; 356/451
(58) Field of Classification Search .............. 356/504,
356/503, 451, 632, 630; 216/60; 250/559.27,
250/559.28

See application file for complete search history.

(56) References Cited

U.S. PATENT DOCUMENTS 5,883,720 A * 3/1999 Akiyama et al. ........... 356/632

FOREIGN PATENT DOCUMENTS

| JP | 55 033644 | 3/1980 |
| JP | 580052475 | 3/1983 |
| JP | 010132767 | 5/1989 |
| JP | 2001021324 | 1/2001 |

OTHER PUBLICATIONS

"Thin Film Thickness Monitor" Solid State Technology, vol. 33, pp. 48-50 (1990).

* cited by examiner

*Primary Examiner*—Tarifur Chowdhury
*Assistant Examiner*—Marissa J. Detschel
(74) *Attorney, Agent, or Firm*—McDonnell Boehnen Hulbert & Berghoff LLP

(57) ABSTRACT

A method of determining the rate of change of optical thickness of a thin-film during deposition comprising the steps of illuminating the thin-film (5) with electromagnetic radiation (3) having a range of wavelengths, measuring the transmission spectrum (6,7) of the thin-film (5) at least twice during the deposition process to determine the wavelength $\lambda_t$ or turning points in the transmission spectrum, and using the measurements to determine the rate to change of optical thickness of the thin-film as a function of time. The method further comprises the steps of predicting a time T in the growth process at which the wavelength $\lambda_t$ of the turning point in the transmission spectrum of the thin-film will be substantially equal to the wavelength $\lambda_d$ of the turning point in the transmission spectrum of thin-film at its optical design thickness, and interrupting the growth process such that growth ceases at time T.

61 Claims, 6 Drawing Sheets

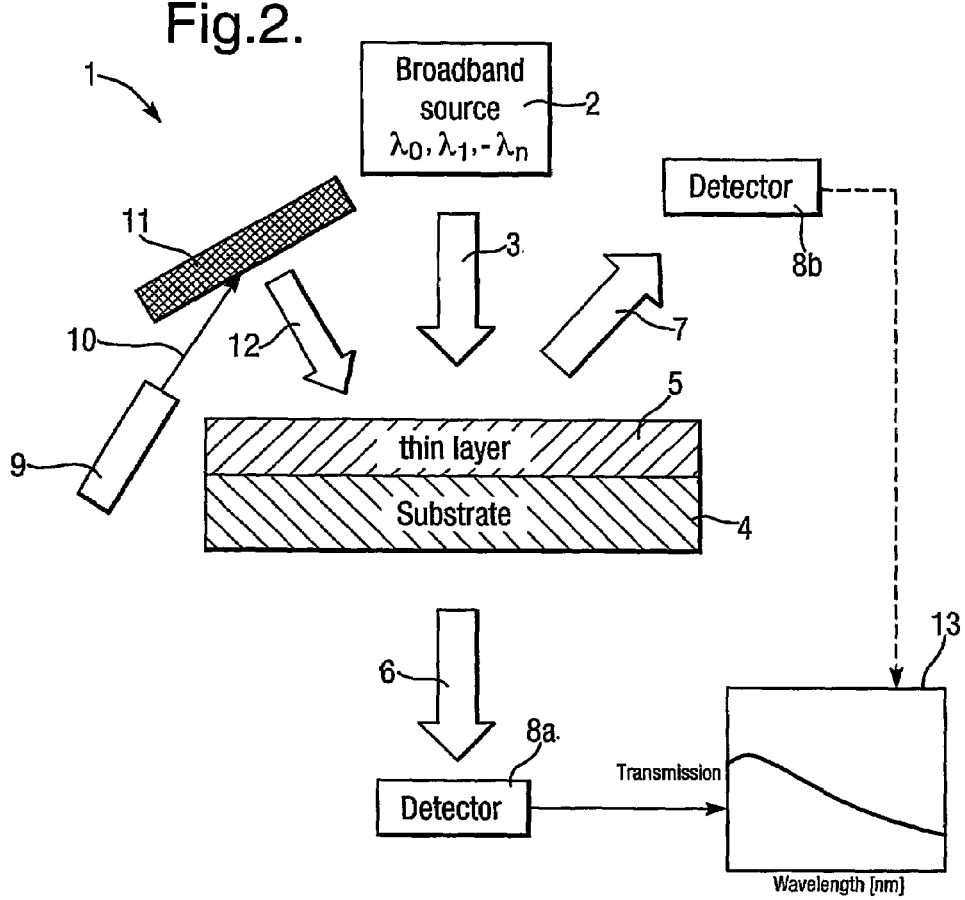
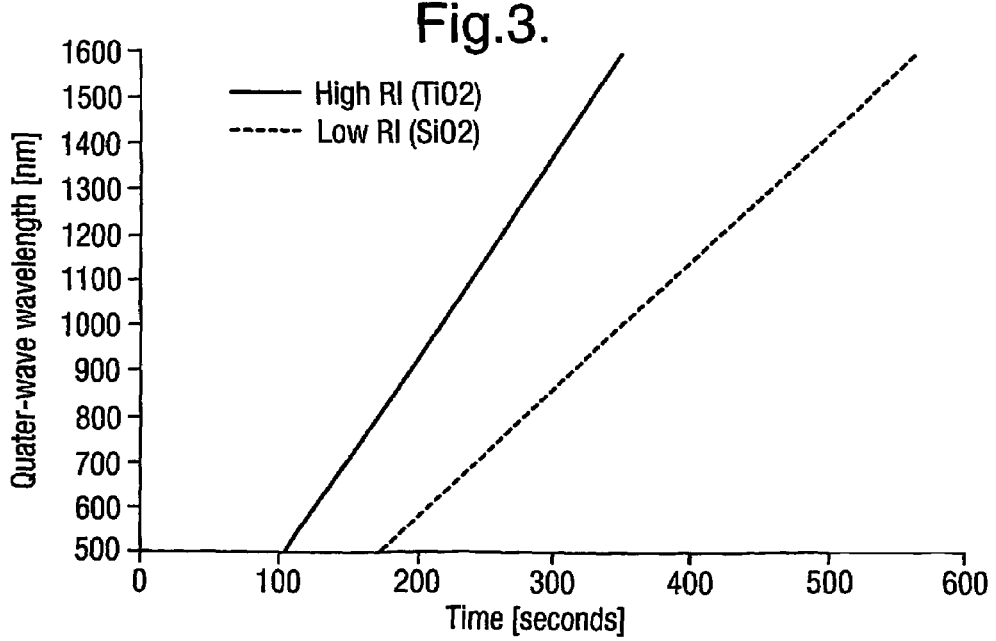

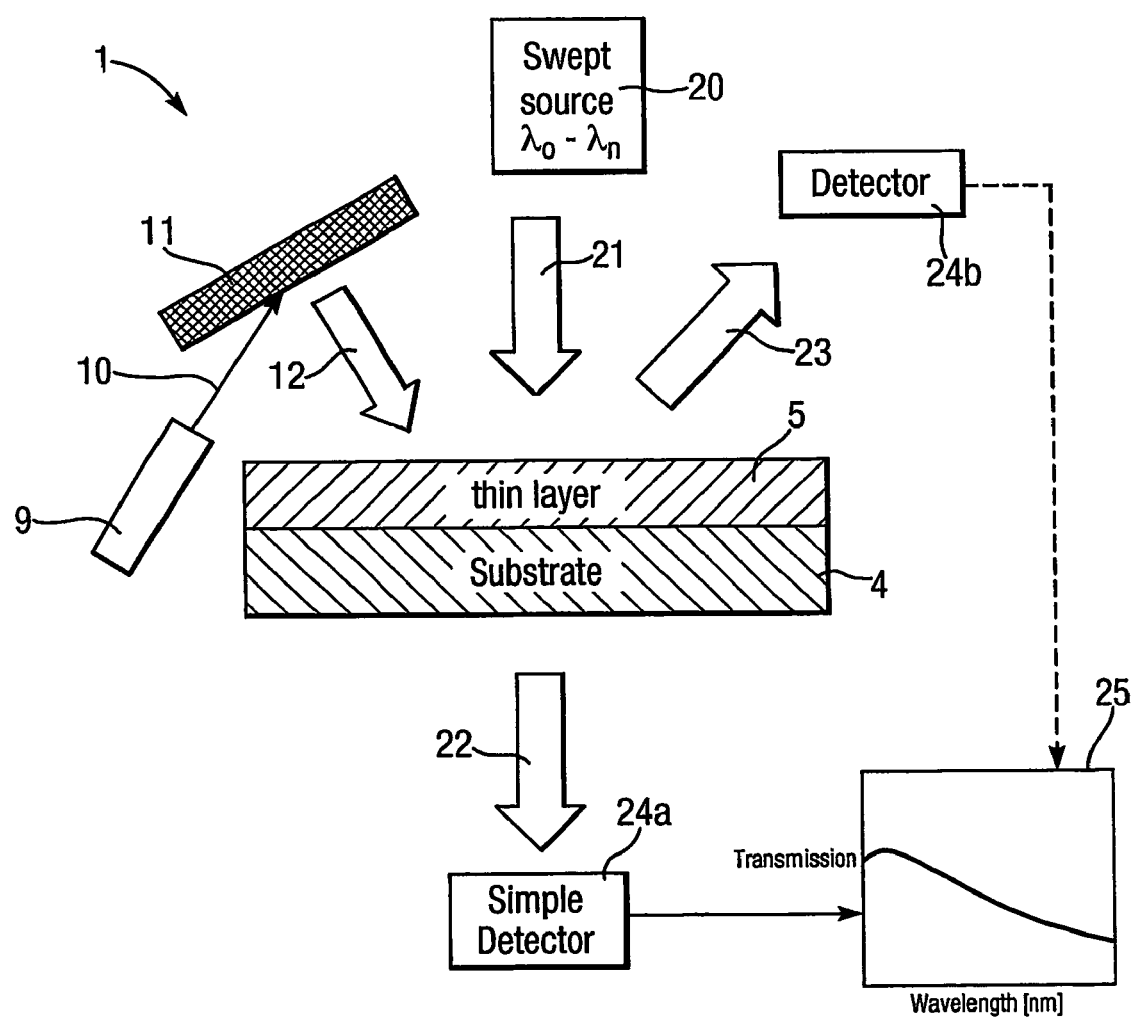

OPTICAL METHOD MEASURING THIN FILM GROWTH

BACKGROUND OF THE INVENTION

1. Field of the Invention

The present invention relates to the growth of thin films, in particular to a method and apparatus for measuring and controlling accurately the optical thickness of a thin film during growth and to devices produced thereby.

2. Description of the Art

Thin film technology is increasingly relevant to a wide range of scientific and industrial fields including semiconductors, optics and telecommunications. One particular application of thin-film technology is in the field of fibre-optic telecommunications, where multi-layer thin-film optical filters are routinely used for wavelength division multiplexing (WDM). Wavelength division multiplexing (WDM) employs multiple optical signal channels simultaneously within a single optical fibre, each optical signal channel using light of a different wavelength. In wavelength division multiplexing, the thin-film optical filters are used to separate out (demultiplex) signals at the receiver.

The above filters effectively govern how much information can be passed down an optical fibre and there is an ever-present requirement to improve the data capacity of such WDM telecommunications systems by reducing the spacing between adjacent signal channels, thereby increasing the number of channels available. Conventional dense wavelength division multiplexing (DWDM) communications systems typically employ over one hundred optical signal channels, evenly spaced at 100 GHz intervals, in the range 186700 GHz to 197100 GHz according to the International Telecommunications Union (ITU) set of standardised frequencies [EXFO Electro-Optical Engineering Inc, Quebec City, Canada, *Guide to WDM technology and testing*, 2000, pp 15].

In an attempt to increase data capacity, the telecommunications industry is now proposing that the channel spacing be further reduced from 100 GHz to 50 GHz. However, such a proposal is not without attendant disadvantages and the reduced channel spacing of 50 GHz places onerous tolerance requirements on the multi-layer thin-film optical filters that are used to demultiplex the signals at the optical-fibre receiver. Consequently, the optical thickness of the individual thin films layers that comprise such a multi-layer filter have to be measured and controlled as precisely as possible during the growth process.

A conventional method for measuring and controlling the optical thickness of a thin-film during growth is to use a quartz-crystal monitor inserted into the growth chamber along with the optical filter substrate [Macleod, H. A. *Thin-film optical filters*. Bristol: Institute of Physics Publishing (IoP), 2001, chapter 11.3.2]

A quartz-crystal monitor is a quartz crystal that is induced to oscillate at a given frequency. The quartz-crystal monitor is placed in the growth chamber so that it is exposed to the same thin film growth as the substrate. In this way, the mass and hence natural frequency of oscillation of the quartz-crystal changes as material is deposited onto the crystal. The change in mass can be translated to physical thickness if the density of the material being deposited is known. However, in order for the optical quarter-wave thickness to be calculated, the refractive index of the thin film at the design wavelength must also be known. These material parameters may depend on the growth process parameters, so may not be known to sufficient accuracy prior to the growth. At present, there is no satisfactory way of measuring the refractive index of the thin-film during deposition.

Optical monitoring systems may also be used to measure and subsequently control the thin-film thickness during growth. Optical monitoring systems typically consist of some sort of light source illuminating a test substrate which may or may not be one of the filters in the production batch, and a detector analysing the reflected or transmitted light [Macleod, H. A. *Thin-film optical filters*. Bristol: Institute of Physics Publishing (IoP), 2001, chapter 11.3.2]

For example, when a DWDM filter is being grown, a laser, whose wavelength is set to be at the design wavelength of the filter, is transmitted through the substrate. The variation in laser light intensity is then measured as the filter grows and the position of the first peak (or trough) in the transmission characteristic is looked for. Growth must be stopped before the first peak (or trough) is passed. This method is sometimes referred to as a laser turning point method. This method is an improvement over the quartz-crystal monitor since no physical parameters of the thin film material are required. However, laser turning point methods suffer several disadvantages. Firstly, terminating the growth process at the first peak (or trough) is difficult to achieve accurately since the intensity of the transmitted laser light can only normally be measured to an accuracy of +/−5% and the rate of change in intensity is very low.

Also, there is no possibility with this method of checking that the true turning point has been reached.

The accuracy of such an optical monitoring system may be improved by simulating the desired optical filter characteristic prior to growth. Typically, a broadband source is used to illuminate the filter and the broadband transmission characteristic is monitored as the filter grows. Deposition is terminated when the difference between the measured transmission characteristic and the simulated transmission characteristic satisfies a pre-determined error criterion.

A hybrid monitoring system utilising a quartz crystal monitor and an optical turning point technique in combination may also improve the accuracy with which the thickness of the individual thin-films layers may be monitored.

Despite any improvements that may be derived from combining the above monitoring techniques, all of the aforementioned methods have another inherent drawback; namely the methods are real-time monitoring techniques which only provide an indication of when the design characteristic of the thin-film has been achieved. Furthermore, any latency between the monitoring system providing an indication that the desired thin-film thickness has been achieved and the cessation of the growth process may lead to unacceptable inaccuracies in the thin-film thickness, leading to a degradation in the performance of the thin-film. Alternatively, the above methods will have to stop the growth process early if there is a significant time to termination of growth after any stop command is given.

SUMMARY OF THE INVENTION

It is an object of the present invention to ameliorate at least some of the disadvantages of the above methods and to provide an improved method and apparatus for monitoring and controlling the thickness of thin-films during growth.

According to the present invention, a method of determining the rate of change of optical thickness of a thin-film during deposition from a material source comprises the steps of illuminating the thin-film with electromagnetic radiation having a range of wavelengths measuring the transmission spectrum of the thin-film to determine the wavelength $\lambda_t$ of a turning point in the transmission spectrum wherein at least two measurements of the transmission spectrum of the thin-film are made during deposition, and the at least two measurements are used to determine the rate of change of optical thickness of the thin-film as a function of time.

The method is advantageous in that the rate of change of optical thickness of the thin-film as a function of time is determined using only measurements of the transmission spectrum of the thin-film. The method does not require knowledge of any physical parameters of the thin film, for example the refractive index of the thin-film or the physical thickness of the thin-film. Moreover, measuring the transmission spectrum including a turning point enables the wavelength of the turning point to be determined accurately.

The above method relies on measuring the spectrum of electromagnetic radiation passing through the thin-film. In practice this may be achieved by illuminating the thin-film with electromagnetic radiation having a range of wavelengths and merely measuring the spectrum of the electromagnetic radiation transmitted through the thin-film. Alternatively, or in addition, electromagnetic radiation transmitted through the thin-film may be reflected back through the thin-film prior to measuring the transmission spectrum. For example, the substrate upon which the thin-film is being deposited may in certain circumstances act to reflect the electromagnetic radiation back through the thin-film to a suitable detector.

The above method may be used to measure the optical thickness of a single thin-film during deposition onto a substrate. However, the technique is equally suited to measuring the optical thickness of a thin-film during deposition onto an underlying thin-film layer or layers. In the case of multiple thin-film layers, the transmission spectrum measured by the detector will be a function of the growing layer in combination with the underlying layers. In such circumstances, allowance must be made for the effects of any underlying layers in order to determine the optical thickness of the growing thin-film layer.

According to a second aspect of the present invention, a method of determining the rate of change of optical thickness of a thin-film during deposition of material from a material source comprises the steps of illuminating the thin-film with electromagnetic radiation having a range of wavelengths measuring the transmission spectrum of the thin-film to determine the wavelength $\lambda_t$ of a turning point in the transmission spectrum, measuring a rate signal directly proportional to the rate of deposition of material and integrating said signal with respect to time, measuring the integral of the rate signal at substantially the same time in the deposition process as the transmission spectrum of the thin-film is measured, wherein at least two measurements of the transmission spectrum of the thin-film are made during deposition, and the at least two measurements are used to determine the rate of change of optical thickness of the thin-film as a function of the integral of the rate signal.

The rate signal may be any signal directly proportional to the rate of deposition of material within the growth process. A separate sensor, for example a quartz-crystal monitor, may be included in the growth chamber to monitor fluctuations in the growth process and to provide an output rate signal directly proportional to the rate of deposition. Alternatively, in certain circumstances the rate of deposition within the growth process may be directly proportional to the electrical characteristics of the material source. In such cases, the rate signal may be obtained by measuring one or more of the electrical parameters of the material source.

According to a third aspect of the present invention, a method of controlling the growth of a thin-film comprises the steps of growing a thin-film onto a substrate, the thin-film having a turning point at wavelength $\lambda_d$ at its optical design thickness, determining the rate of change of optical thickness of the thin-film according to the second aspect of the present invention, predicting a value for the integral of the rate signal at which the wavelength $\lambda_t$ of the turning point in the transmission spectrum of the thin-film will be substantially equal to the wavelength $\lambda_d$ of the thin-film at its optical design thickness, and interrupting the growth process such that growth ceases at the point when the integral of the rate signal is equal to the predicted value.

According to a fourth aspect of the present invention, a method of determining the rate of change of optical thickness of a thin-film during deposition from a material source comprises the steps of illuminating the thin-film with electromagnetic radiation having a range of wavelengths measuring the transmission spectrum of the thin-film to determine the wavelength $\lambda_t$ of a turning point in the transmission spectrum, measuring the cumulative energy supplied to the material source at substantially the same time in the deposition process as the transmission spectrum of the thin-film is measured, wherein at least two measurements of the transmission spectrum of the thin-film are made during deposition, and the at least two measurements are used to determine the rate of change of optical thickness of the thin-film as a function of the cumulative energy supplied.

The method of determining the rate of change of optical thickness of the thin-film as a function of cumulative energy supplied to the material source rather than as a function of time is advantageous in that allowance can be made for process fluctuations arising from variations in the material source power.

Preferably, the step of measuring the cumulative energy comprises the steps of monitoring the power consumed by the material source and integrating the power to determine the cumulative energy supplied to the material source.

According to a fifth aspect of the present invention, a method of determining the rate of change of optical thickness of a thin-film during deposition from a material source comprises the steps of illuminating the thin-film with electromagnetic radiation having a range of wavelengths measuring the transmission spectrum of the thin-film to determine the wavelength $\lambda_t$ of a turning point in the transmission spectrum measuring the cumulative charge supplied to the material source at substantially the same time in the deposition process as the transmission spectrum of the thin-film is measured, wherein at least two measurements of the transmission spectrum of the thin-film are made during deposition, and the at least two measurements are used to determine the rate of change of optical thickness of the thin-film as a function of the cumulative charge supplied.

The method of determining the rate of change of optical thickness of the thin-film as a function of cumulative charge supplied to the material source rather than as a function of time is advantageous in that allowance can be made for process fluctuations arising from variations in the material source current.

Preferably, the step of measuring the cumulative charge comprises the steps of monitoring the current consumed by the material source and integrating the current to determine the cumulative charge supplied to the material source.

Hence, the cumulative charge may be determined from the material source current, for example using ammeter readings.

According to a further aspect of the present invention a method of controlling the growth of a thin-film comprises the steps of growing a thin-film onto a substrate, the thin-film having a turning point at wavelength $\lambda_d$ at its optical design thickness, determining the rate of change of optical thickness of the thin-film as a function of time as described above predicting a time T in the growth process at which the wavelength $\lambda_t$ of the turning point in the transmission spectrum of thin-film will be substantially equal to the wavelength $\lambda_d$ of the thin-film at its optical design thickness, and interrupting the growth process such that growth ceases at time T.

The predictive nature of the above method of controlling thin-film growth provides the advantage that real-time monitoring techniques are not required once the rate of change of optical thickness of the film has been determined. Further, allowance may be made for any latency in terminating the growth process, thereby improving the accuracy with which the thin-film may be deposited.

According to a further aspect of the present invention, a method of controlling the growth of a thin-film comprises the steps of growing a thin-film onto a substrate, the thin-film having a turning point at wavelength $\lambda_d$ at its optical design thickness, determining the rate of change of optical thickness of the thin-film as a function of the cumulative energy supplied as described above, predicting the cumulative energy E in the growth process at which the wavelength $\lambda_t$ of the turning point in the transmission spectrum of the thin-film will be substantially equal to the wavelength $\lambda_d$ of the thin-film at its optical design thickness, and interrupting the growth process such that growth ceases at the point when cumulative energy E has been supplied to the material source.

The predictive nature of the above method of controlling thin-film growth provides the advantage that the growth of the thin-film does not need to be monitored throughout the entire growth process. Interrupting the growth process once cumulative energy E has been supplied to the material source enables allowance to be made for process fluctuations arising from variations in the material source power, thereby improving the accuracy of the process.

According to another aspect of the present invention a method of controlling the growth of a thin-film comprises the steps of growing a thin-film onto a substrate, the thin-film having a turning point at wavelength $\lambda_d$ at its optical design thickness, determining the rate of change of optical thickness of the thin-film as a function of the cumulative charge supplied as described above predicting the cumulative charge C in the growth process at which the wavelength $\lambda_t$ of the turning point in the transmission spectrum of thin-film will be substantially equal to the wavelength $\lambda_d$ of the thin-film at its optical design thickness, and interrupting the growth process such that growth ceases at the point when cumulative charge C has been supplied to the material source.

Similarly, the predictive nature of the above method of controlling thin-film growth provides the advantage that the growth of the thin-film does not need to be monitored throughout the entire growth process. Interrupting the growth process once cumulative charge C has been supplied to the material source enables allowance to be made for process fluctuations arising from variations in the material source current, thereby improving the accuracy of the process.

Preferably, the step of determining the rate of change of optical thickness of the thin-film comprises the step of determining the rate of change of the wavelength $\lambda_t$ of the turning point in the transmission spectrum. As mentioned above, the method does not require any knowledge of the physical parameters of the thin-film being deposited, for example the refractive index of the thin-film or the physical thickness of the thin-film. Indeed, the physical thickness of the thin-film may not be known throughout the entire growth process. Rather, the rate of change of optical thickness of the thin-film is determined from the rate of change of the wavelength $\lambda_t$ of the turning point in the transmission spectrum. For any given turning point in the transmission spectrum, the optical thickness of the thin-film may be determined in terms of integer multiples of one-quarter of wavelength $\lambda_t$ at that particular turning point.

In a preferred embodiment, the method of controlling the growth of the thin-film further comprising the steps of measuring the transmission spectrum of the thin-film after the interruption in the growth process, determining the wavelength $\lambda_t$ of the turning point in the transmission spectrum for the grown thin-film, comparing the wavelength $\lambda_t$ of the turning point for the grown thin-film with the wavelength $\lambda_d$ of the turning point for the thin-film at its optical design thickness to provide an indication $\Delta\lambda$ of the error there-between, and compensating for $\Delta\lambda$ by controlling the growth of subsequent thin-film layers.

Inaccuracies in the growth of thin-film layers that comprise multi-layer structures may be reduced or eliminated using this method. The overall performance of such a multi-layer structure, for example a filter, may therefore be maintained and production yields improved.

Preferably the material source comprises an ion-beam source, ion beam plating means, evaporation means or sputtering means.

In a preferred embodiment the electromagnetic radiation may comprise broadband electromagnetic radiation and the transmission spectrum of the thin-film may be measured using a spectrometer. For example, the spectrometer may comprise a grating spectrometer and the electromagnetic radiation may be produced using at least one of an incandescent lamp and a filament.

Alternatively, or in addition, the electromagnetic radiation may comprise tuneable narrow-band electromagnetic radiation, the narrow-band electromagnetic radiation may be tuned through at least part of the transmission spectrum of the thin-film and the transmission spectrum of the thin-film may be measured using an intensity detector.

Preferably, the electromagnetic radiation comprises wavelengths in the range 400 nm to 1620 nm.

According to another aspect of the present invention, apparatus for determining the rate of change of optical thickness of a thin-film during deposition from a material source comprises a source of electromagnetic radiation having a range of wavelengths measuring means arranged to measure the transmission spectrum of the thin-film and configured to determine the wavelength $\lambda_t$ of a turning point in the transmission spectrum means for determining the rate of change of optical thickness of the thin-film as a function of time from at least two measurements of the transmission spectrum of the thin-film during deposition.

The apparatus provides the advantage that the rate of change of optical thickness of the thin-film as a function of time may determined using only measurements of the transmission spectrum of the thin-film. The apparatus does not need to measure any physical parameters of the thin film, for example the refractive index of the thin-film or the physical thickness of the thin-film. Moreover, measuring the transmission spectrum including a full turning point enables the wavelength of the turning point to be determined accurately.

According to another aspect of the present invention, apparatus for determining the rate of change of optical thickness of a thin-film during deposition of material from a material source comprises a source of electromagnetic radiation having a range of wavelengths measuring means arranged to measure the transmission spectrum of the thin-film and configured to determine the wavelength $\lambda_t$ of a turning point in the transmission spectrum means for measuring a rate signal directly proportional to the rate of deposition of material and means for integrating said rate signal with respect to time, means for measuring the integral of the rate signal at substantially the same time in the deposition process as the transmission spectrum of the thin-film is measured, means for determining the rate of change of optical thickness of the thin-film, as a function of the integral of the rate signal, from at least two measurements of the transmission spectrum of the thin-film during deposition.

According to a further aspect of the present invention, apparatus for controlling the growth of a thin-film on a substrate, the thin-film having a turning point at wavelength $\lambda_t$ at its optical design thickness, comprises means as described above for determining the rate of change of optical thickness of the thin-film as a function of the integral of the rate signal, means for predicting a value for the integral of the rate signal at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at the point when the integral of the rate signal is equal to the predicted value.

According to another aspect of the present invention, apparatus for determining the rate of change of optical thickness of a thin-film during deposition from a material source comprises a source of electromagnetic radiation having a range of wavelengths, measuring means arranged to measure the transmission spectrum of the thin-film and configured to determine the wavelength $\lambda_t$ of a turning point in the transmission spectrum, means for measuring the cumulative energy supplied to the material source at substantially the same time in the deposition process as the transmission spectrum of the thin-film is measured, means for determining the rate of change of optical thickness of the thin-film, as a function of the cumulative energy supplied to the material source, from at least two measurements of the transmission spectrum of the thin-film during deposition.

In a preferred embodiment, the means for measuring the cumulative energy supplied to the material source comprise means for monitoring the power consumed by the material source and means for integrating the power to determine the cumulative energy supplied to the material source.

According to a further aspect of the present invention, apparatus for determining the rate of change of optical thickness of a thin-film during deposition from a material source comprises a source of electromagnetic radiation having a range of wavelengths measuring means arranged to measure the transmission spectrum of the thin-film and configured to determine the wavelength $\lambda_t$ of a turning point in the transmission spectrum means for measuring the cumulative charge supplied to the material source at substantially the same time in the deposition process as the transmission spectrum of the thin-film is measured, means for determining the rate of change of optical thickness of the thin-film as a function of the cumulative charge supplied to the material source from at least two measurements of the transmission spectrum of the thin-film during deposition.

The means for determining the rate of change of optical thickness of the thin-film as a function of cumulative charge supplied to the material source rather than as a function of time is advantageous in that allowance can be made for process fluctuations arising from variations in the material source current.

In a preferred embodiment, the means for measuring the cumulative charge supplied to the material source may comprise means for monitoring the current consumed by the material source and means for integrating the current to determine the cumulative charge supplied to the material source. Hence, the cumulative charge may be determined from the means for monitoring the current consumed by the material source. For example, the means for monitoring the current consumed by the material source may be an ammeter.

According to one aspect of the present invention, apparatus for controlling the growth of a thin-film on a substrate, the thin-film having a turning point at wavelength $\lambda_d$ at its optical design thickness, comprises means as described above for determining the rate of change of optical thickness of the thin-film as a function of time, means for predicting a time T in the growth process at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at point T.

The means for predicting the time T in the growth process at which the wavelength $\lambda_t$ of the turning point in the transmission spectrum of thin-film will be substantially equal to the wavelength $\lambda_d$ of the thin-film at its optical design thickness provide the advantage that real-time monitoring techniques are not required once the rate of change of optical thickness of the film has been determined. Further, allowance may be made for any latency in terminating the growth process thereby improving the accuracy with which the thin-film may be deposited.

According to another aspect of the present invention, apparatus for controlling the growth of a thin-film on a substrate, the thin-film having a turning point at wavelength $\lambda_d$ at its optical design thickness, comprises means as described above for determining the rate of change of optical thickness of the thin-film as a function of the cumulative energy supplied, means for predicting the cumulative energy E in the growth process at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at the point when cumulative energy E has been supplied to the material source.

The means for predicting the cumulative energy E in the growth process at which the wavelength $\lambda_t$ of the turning point in the transmission spectrum of thin-film will be substantially equal to the wavelength $\lambda_d$ of the thin-film at its optical design thickness provide the advantage that the growth of the thin-film does not need to be monitored throughout the entire growth process. Interrupting the growth process once cumulative energy E has been supplied to the material source enables allowance to be made for process fluctuations arising from variations in the material source power, thereby improving the accuracy with which the thin-film may be grown.

According to another aspect of the present invention, apparatus for controlling the growth of a thin-film on a substrate, the thin-film having a turning point at wavelength $\lambda_d$ at its design thickness, comprises means as described above for determining the rate of change of optical thickness of the thin-film as a function of the cumulative charge supplied to the material source, means for predicting the cumulative charge C in the growth process at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at the point when cumulative charge C has been supplied to the material source.

Similarly, the means for predicting the cumulative charge C in the growth process at which the wavelength $\lambda_t$ of the turning point in the transmission spectrum of thin-film will be substantially equal to the wavelength $\lambda_d$ of the thin-film at its optical design thickness provide the advantage that the growth of the thin-film does not need to be monitored throughout the entire growth process. Interrupting the growth process once cumulative charge C has been supplied to the material source enables allowance to be made for process fluctuations arising from variations in the material source current, thereby improving the accuracy with which the thin-film may be grown.

The means for determining the rate of change of optical thickness of the thin-film may comprise means for determining the rate of change of the wavelength $\lambda_t$ of the turning point in the transmission spectrum.

The apparatus does not need to measure any physical parameters of the thin-film being deposited, for example the refractive index of the thin-film or the physical thickness of the thin-film. Rather, the apparatus determines the rate of change of optical thickness of the thin-film by measuring the rate of change of the wavelength $\lambda_t$ of the turning point in the transmission spectrum. For any given turning point in the transmission spectrum, the apparatus is capable of determining the optical thickness of the thin-film in terms of integer multiples of one-quarter of wavelength $\lambda_t$ at that particular turning point.

The material source may comprises an ion-beam source, ion beam plating means, evaporation means or sputtering means.

In a preferred embodiment, the source of electromagnetic radiation comprises a broadband source of electromagnetic radiation and the measuring means for measuring the transmission spectrum of the thin-film comprises a spectrometer. The source of electromagnetic radiation may comprise at least one of an incandescent lamp and a filament and the spectrometer may comprise a grating spectrometer.

Alternatively, or in addition, the source of electromagnetic radiation may comprise a narrow-band source of electromagnetic radiation, tuneable through at least part of the transmission spectrum of the thin-film, and the measuring means for measuring the transmission spectrum of the thin-film may comprise an intensity detector.

Preferably, the source of electromagnetic radiation is arranged to emit electromagnetic radiation at wavelengths in the range 400 nm to 1620 nm.

DESCRIPTION OF THE FIGURES

The invention will now be described, by example only, with reference to the accompanying drawings in which;

FIG. 2 shows a schematic representation of one embodiment of the apparatus of the present broadband optical thin-film thickness monitor.

FIG. 3 shows a typical graph of the curves used for estimating the switch-off time for the broadband optical thin-film thickness monitor.

FIG. 4 shows a schematic representation of the apparatus of the optical thin-film thickness monitor utilising a tuneable source and simple detector.

DESCRIPTION OF A PREFERRED EMBODIMENT

Referring to FIG. 1, when light is passed through a thin dielectric film, interference effects occur. In particular, when a collimated beam of broadband light is passed through a thin-film, the spectrum of the transmitted light is seen to contain peaks and troughs, which were not present in the spectrum of the light source. The position of these peaks and troughs contain information relating to the thickness of the thin-film.

Figure 1A:
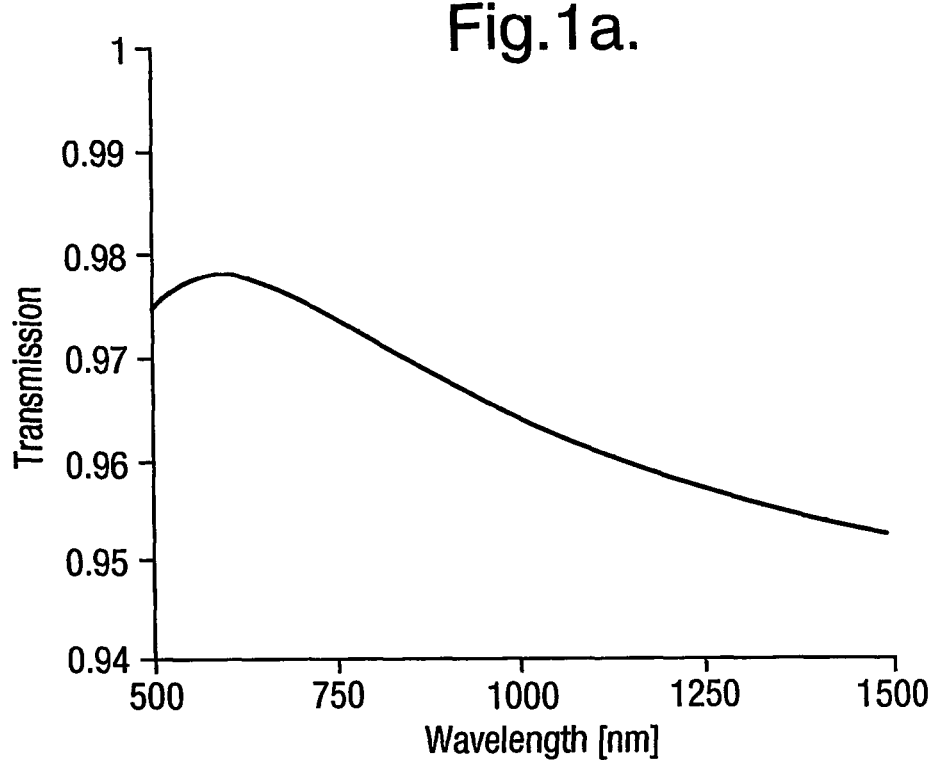
FIG. 1 shows a series of graphs illustrating a peak travelling through the spectrum for a thin-film during growth. The graphs indicate the change in optical thickness at the turning point as the thin-film is deposited.
Figure 1B:
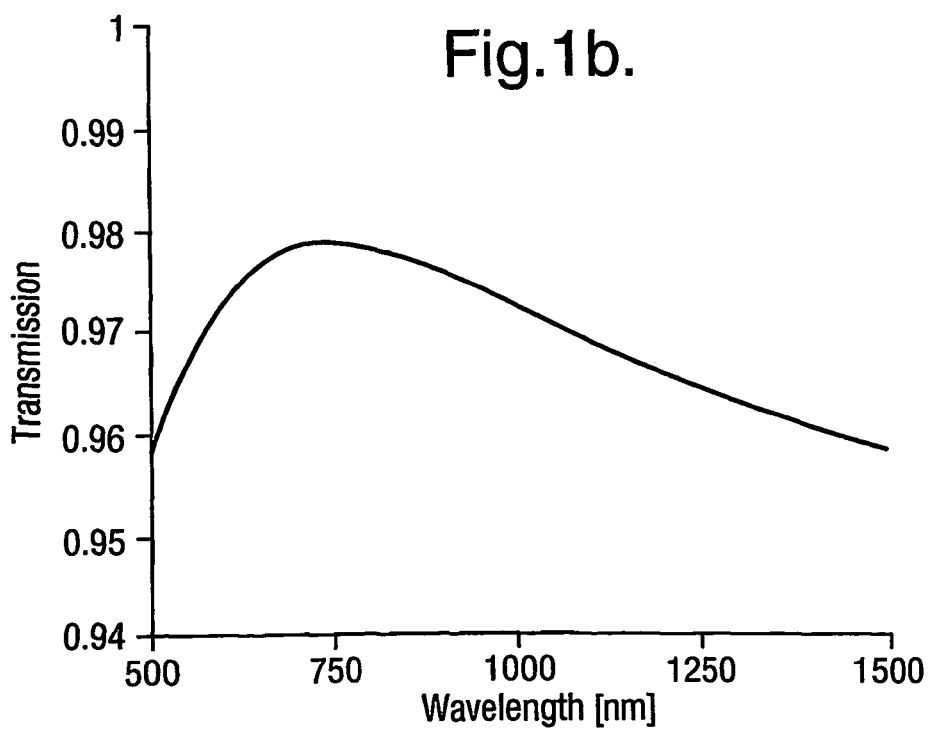
Figure 1C:
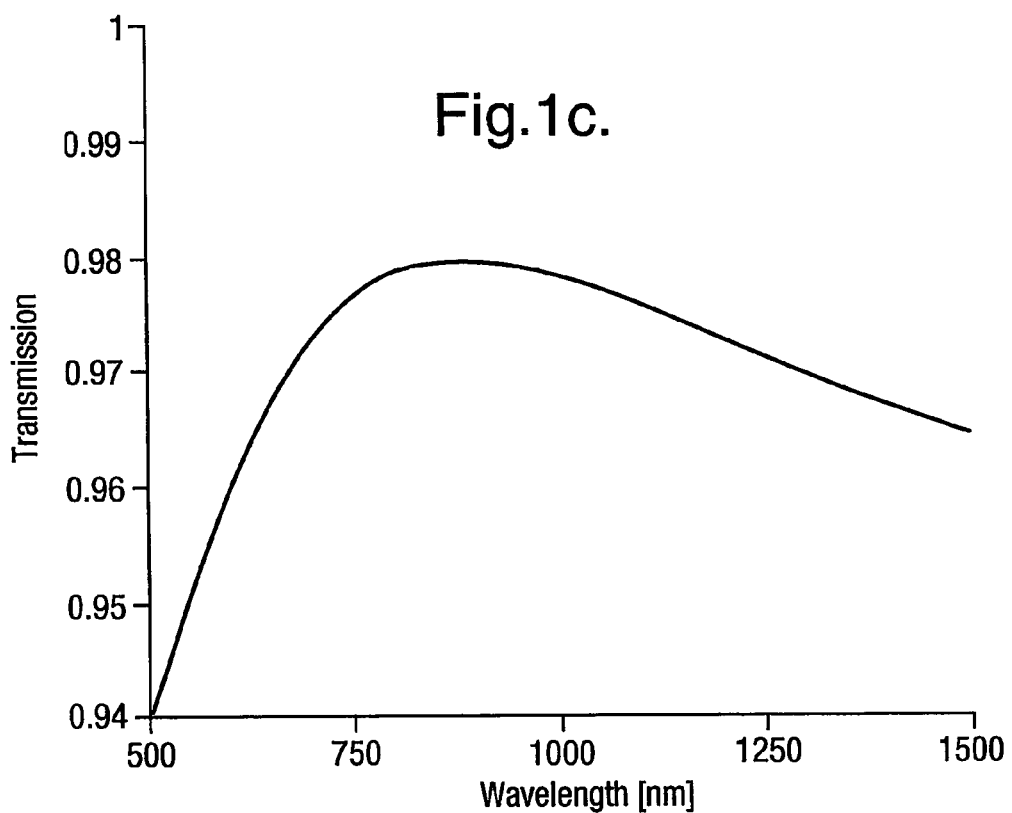
Figure 1D:
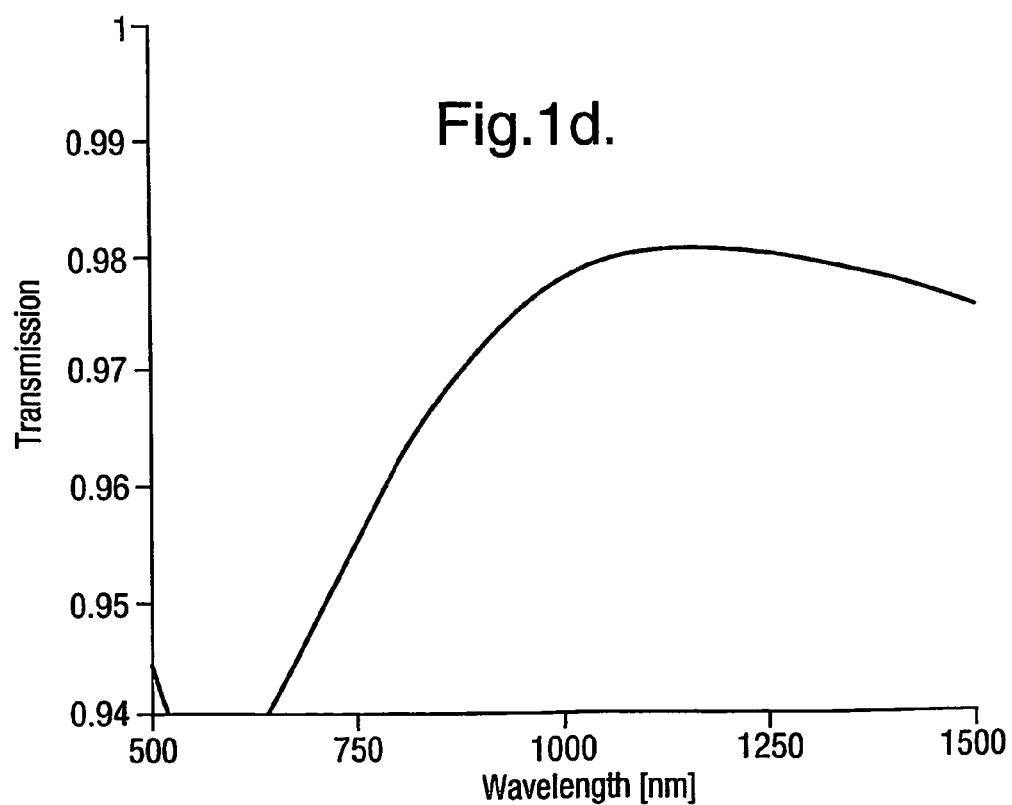

At the start of the growth process, a thin-film has zero thickness that increases until the required thickness is reached. If the spectrum of the broadband source is observed at a number of different times during this process, a peak or trough of intensity (turning point) is seen to travel through the spectrum in the direction of increasing wavelength. At any given time, the position of this turning point occurs at the wavelength at which the film thickness is an integer number of optical quarter-waves. For example, FIG. 1a shows a "snapshot" of the spectrum of a typical thin-film filter at a particular point near to the start of the growth process. It should be pointed out that the thickness measured is the 'optical' quarter wave thickness. This is equal to the refractive index of the film material times the particular quarter wavelength. In general however, the refractive index of the film material is not known to sufficient accuracy for the purposes of calculating the actual physical thickness of the film.

As the layer gets thicker, more turning points appear in the spectrum. These represent points at which the optical thickness is two times or three times the quarter wave thickness etc.

DWDM filters usually consist of a stack of several hundred thin-film layers using just two different materials grown in the correct order. The thin-film layers may typically comprise high refractive index layers of titanium dioxide ($TiO_2$) or tantalum pentoxide ($Ta_2O_5$), and low refractive index layers of silicon dioxide ($SiO_2$). Each layer is typically specified to be one-quarter wavelength or integer multiples of one-quarter wavelength in optical thickness at the design wavelength. Alternatively, some of the thin-film layers may be specified as being a fraction of the quarter-wave optical thickness at the design wavelength. The design wavelength is the wavelength at which the centre of the passband is to be placed.

Referring to FIG. 2, The apparatus of the optical thin-film thickness monitor (1) comprises a source (2) of broadband light (3) and a detector (8a) for detecting light (6) transmitted through the substrate (4) and the thin-layer (5). Alternatively the apparatus (1) may be arranged such that the detector (8b) is configured to detect light (7) reflected from the substrate (4) and the thin-layer (5).

Typically, the growth process comprises depositing material (12) from a target (11) onto the substrate (4) to form the thin-film (5). Ion beam sputtering may be employed which utilises an ion beam (10) generated by an ion source (9) to eject material (12) from a target (11). Alternatively, any conventional growth process may be used, for example evaporation or magnetron sputtering. Hereinafter, the means for depositing the material (12) onto the substrate (4) shall be referred to generically as the material source. Hence, the material source may comprise any of an ion beam source, an evaporation source and a sputtering source.

Referring to FIG. 3, the method according to the present invention of measuring the thin-film thickness comprises measuring the optical spectral passband, in transmission or reflection, of the film at different times during its growth and monitoring the wavelength position of the quarter-wave turning point (peak or trough). As the film grows, a set of data points consisting of optical thickness (OT) versus time is built up. A curve can be fitted to these points and extrapolated forwards to give the (OT, time) co-ordinate for the design wavelength. It is now possible to predict the time at which to stop growth of the layer; when the correct optical thickness (OT) is obtained. An extrapolation of the data is useful if the growth process takes a finite time to terminate and needs to be given a stop command before the final layer thickness is achieved.

In the above method, the growth process may be stopped at the predicted time so that the thin-film is one-quarter wavelength or integer multiples of one-quarter wavelength in optical thickness at the design wavelength. Alternatively, an adjustment may be applied to the growth curve and/or the predicted time so that the resultant thin-film is a fraction of one-quarter wavelength or non-integer multiples of one-quarter wavelength in optical thickness at the design wavelength.

Once layer growth has stopped, the optical spectrum in the region of the design wavelength can be inspected to see if there was any error in the layer thickness. If there was, then the offset of the quarter-wave peak from the design wavelength can be used to calculate an adjustment for the next layer thickness.

The above optical method has the advantage that every time a measurement is taken during the growth process, a full broadband spectrum is obtained and hence a quarter-wave turning point is always available. It is therefore possible to be sure that a true turning point has been found. Also, it is possible to check the final position of the true turning point when growth has stopped, thus allowing accurate compensation to be made in future layers if necessary. No physical parameters of the thin film material are required.

The method according to the present invention has been described above in terms of measuring the optical thickness of a single thin-film during deposition onto a substrate. In practice a multi-layer filter may comprise many such thin-film layers and the above technique is equally suited to measuring the optical thickness of a thin-film during deposition onto an underlying thin-film layer or layers. However, when the method is used with multiple thin-film layers, the transmission spectrum measured by the detector (8a, 8b) will be dependent upon the cumulative effect of all the thin-film layers in combination. The transmission spectrum will be a function of the growing layer in combination with any underlying layer(s). Furthermore, as the number of layers increases, the transmission spectrum will become increasingly complex and will tend towards the desired characteristic of the final filter. Accordingly, allowance must be made for the effects of any underlying layers in order to determine the optical thickness of the growing thin-film layer.

Simple enhancements may be made to the foregoing basic method in order to take into consideration any previously deposited layers.

For example, consider the case of a thin-film layer being deposited onto an underlying layer or layers. The cumulative transmission spectrum characteristic of all the combined layers will exhibit a turning point which will move through the transmission versus wavelength characteristic as the thin-film layer grows (see FIG. 1 previously). However, as the number of thin-film layers increases, it becomes difficult to identify the turning point associated with the growing layer within the complex transmission spectrum. In order to facilitate the location of a turning point for a given wavelength associated with the growing layer, the method may be enhanced by monitoring the transmission intensity for all wavelengths in the transmission spectrum with respect to time and identifying the time at which the measured intensity passes through a turning point for each given wavelength. A set of data points consisting of optical thickness (OT) versus time may be built up in the same manner as with the basic method. A curve can be fitted to these points and extrapolated forwards to give the (OT, time) co-ordinate for the design wavelength.

Alternatively, when using the basic method according to the present invention, the effects of any underlying layer(s) may be removed from the transmission spectrum measurements by dividing the cumulative transmission spectrum measurements by those obtained during the growth of the underlying layer(s), thereby normalising the transmission spectra for the growing layer. However, this modification requires the storage of transmission spectra obtained during the growth of the underlying layer(s).

Ideally, the source (2) of broadband light (3) should have a flat wavelength characteristic over the desired range of measurement wavelengths. When growing thin-film optical filters for DWDM applications, the range of wavelengths monitored during growth may typically extend from 400 nm to 1620 nm. However, this wavelength range may be different for different thin-film materials aimed at different applications, for example semiconductor thin-films.

In practice, the source (2) of broadband light (3) does not have to exhibit a perfect flat wavelength characteristic over the full measurement range since the spectrum of the source (2) may be measured at the outset to give a reference spectrum. All subsequent measurements made during the growth process can then be divided by the reference spectrum to provide a set of normalised spectra readings.

Hence, the source (2) of broadband light (3) may comprise an incandescent lamp or a filament and the detector (8a, 8b) may comprise a spectrometer, for example a grating spectrometer sensitive to wavelengths in the visible, near infrared and infrared spectrum.

Whilst a suitable source (2) of broadband light (3) may be readily available, difficulties may be encountered in providing a single spectrometer sensitive over the entire measurement range of 400 nm–1620 nm. Therefore, multiple detectors (8a, 8b) may be required to cover the full range of measurement wavelengths.

Referring to FIG. 4, an alternative or additional measurement system for obtaining a broadband spectrum measurement of the thin-film during growth comprises a tuneable source and a simple detector (8a, 8b). In use, the source output is swept through its output wavelength range and intensity readings are taken from the detector (8a, 8b). As before, a transmission (or reflection) spectrum including turning points (peaks or troughs in the spectrum) is obtained for each measurement during the growth process. In practice, the time taken for the source output to sweep through its wavelength range should be kept as short as possible, so as to capture a short snapshot within the growth process.

Such a system may be used in combination with the configuration of FIG. 2 to provide a two-channel measurement system. A suitable source may comprise a tuneable telecommunications laser operating in the infrared spectrum. Such a two-channel system may be beneficial since the range of wavelengths over which measurements can be made may be increased.

In order to obtain optimum results, the foregoing method of measuring thin-film thickness relies on the rate of deposition within the growth process to remain fairly constant. Inaccuracies in the thickness of the thin-film may occur if the growth conditions change between the extrapolation of the data obtained from the process measurements and the predicted time at which the growth process is to be terminated.

The accuracy of the method may however be improved by monitoring the growth process to detect any process fluctuations that might affect the thin-film during deposition. Variations in the electrical characteristics of the material source, for example the voltage applied to the material source, the current consumed by the material source or the power of the material source, may give rise to fluctuations in the rate of deposition within the growth process.

A separate sensor, for example a quartz-crystal monitor, may be included in the growth chamber to monitor fluctuations in the growth process and to provide an output signal directly proportional to the rate of deposition. The accuracy of the method may improved by monitoring the output from the sensor and making suitable allowance for variations in the sensor signal.

In certain circumstances, the rate of deposition within the growth process may be directly proportional to the electrical characteristics of the material source. In such cases, the accuracy of the method may be improved by measuring one or more of the electrical parameters of the material source and by making suitable allowance for variations in the measured electrical parameter.

For example, in the case of deposition of material by evaporation, the growth rate of the thin-film is proportional to the power of the evaporator (i.e. the product of the evaporator voltage and current). Accordingly, if the power of the evaporator is monitored, allowance can be made for process fluctuations arising from variations in the evaporator power.

During the growth process the evaporator power is monitored and integrated to provide a cumulative measure of the total energy supplied to the evaporator. As before, the optical spectral passband of the thin-film is measured at different times during its growth and the wavelength position of the quarter-wave turning point (peak or trough) is measured. As the film grows, a set of data points consisting of optical thickness (OT) versus total energy in joules (rather than time as before) is built up. The optical thickness (OT) and the total energy supplied are both measured at the same moment in time to capture each data point, (OT, energy). A curve can be fitted to these points and extrapolated forwards to give the (Total energy, OT) co-ordinate for the design wavelength.

Similarly, in the case of ion-beam sputtering, the growth rate of the thin-film is proportional to the current supplied to the ion source. Accordingly, if the current supplied to the ion-beam source is monitored, allowance can be made for process fluctuations arising from variations in the ion-beam source current.

Figure 5:
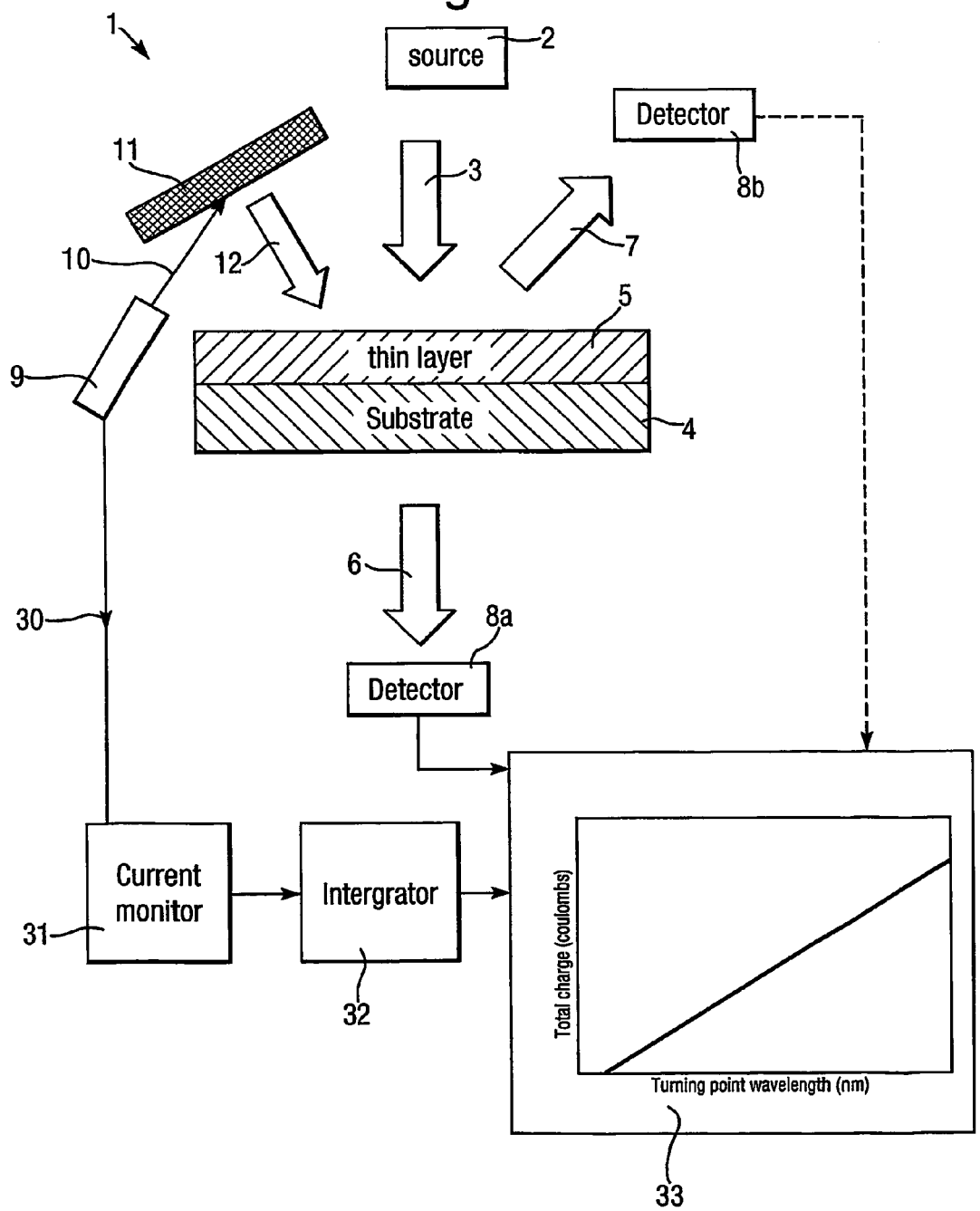
FIG. 5 shows a further schematic representation of the apparatus incorporating a current monitor for measuring the current supplied to the ion-source. The apparatus also includes an integrator to provide a cumulative measure of the total number of coulombs of charge supplied to the ion source.

Referring to FIG. 5, during the growth process the current (30) supplied to the ion source is monitored (31) and integrated (32) to provide a cumulative measure of the total number of coulombs of charge supplied to the ion source. As before, the optical spectral passband of the thin-film is measured at different times during its growth and the wavelength position of the quarter-wave turning point (peak or trough) is measured. As the film grows, a set of data points (33) consisting of optical thickness (OT) versus total charge in coulombs (rather than time as before) is built up. The optical thickness (OT) and the total charge supplied are both measured at the same moment in time to capture each data point, (OT, charge).

Figure 6:
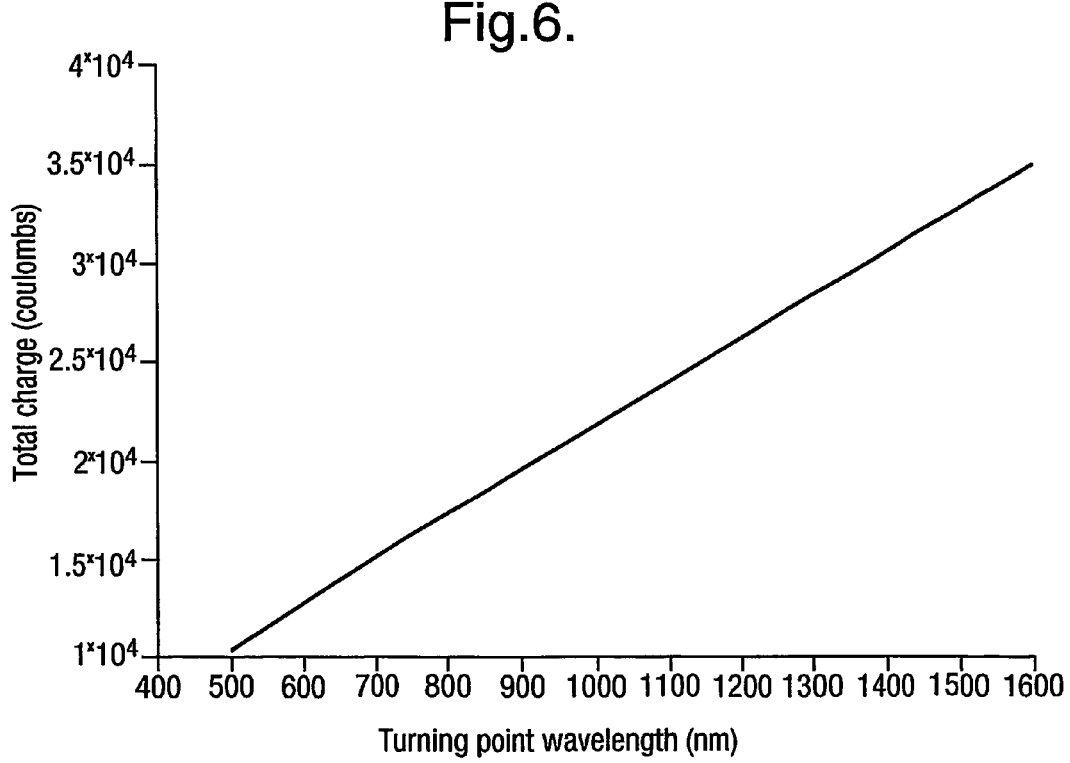
FIG. 6 shows a typical characteristic of total charge (coulombs) versus turning point wavelength (nm) produced using the apparatus of FIG. 5. The graph may be used for estimating the switch-off time for the broadband optical thin-film thickness monitor.

Referring to FIG. 6, a curve can be fitted to these points and extrapolated forwards to give the (Total charge, OT) co-ordinate for the design wavelength.

In particular, the extrapolation forwards of the total charge versus OT curve would have to take into account refractive index dispersion of the thin film material. This can be seen in FIG. 6 where the plotted curve is not quite linear, but has a weak dependence on thin film refractive index. In general, the curve in FIG. 6 can be simply modelled as, $$Q = Q_0 + Q_1(\lambda) \cdot \lambda_{1/4} \quad (1)$$

Where Q is the total charge accumulated, $Q_0$ is any charge accumulated before growth starts, $\lambda_{1/4}$ is the quarter-wave wavelength and $Q_1(\lambda)$ is a multiplication factor. $Q_1(\lambda)$ has a weak dependence on wavelength, the form of which can be obtained from any of the well known dispersion relations. An example would be the first two terms from the Cauchy dispersion equation, so that $Q_1 = a + b/(\lambda_{1/4})^2$, where a and b are constants, giving $$Q = Q_0 + a \cdot \lambda_{1/4} + \frac{b}{(\lambda_{1/4})^2} \quad (2)$$

In this way, measured data points of charge Q and quarter-wave wavelength $\lambda_{1/4}$ would be used to determine the constants $Q_0$, a and b. No knowledge of the actual refractive index values of the thin film material would be required.

The curve is a characteristic of the particular growth system (chamber, thin-film material etc.) and is independent of time and growth rate fluctuations. It is now possible to monitor and control the amount of charge supplied to the ion-beam source and stop the growth of the thin-film layer when the correct optical thickness (OT) is obtained. Once again extrapolation of the data allows the growth process to be stopped before the final layer thickness is achieved to allow for any latency in terminating the growth process.

This enhanced measuring system provides an improved way of monitoring the optical thickness of the thin-film independent of any time measurements. Furthermore, the technique is insensitive to variations in the growth process arising out of fluctuations in the electrical characteristics of the material source (e.g. evaporator power or ion-beam source current).

Once layer growth has stopped, the optical spectrum in the region of the design wavelength can be inspected to see if there was any error in the layer thickness. If there was, then the offset of the quarter-wave peak from the design wavelength can be used to calculate an adjustment for the next layer thickness. Throughout this specification the measurement and control of thin-film thickness has been described with reference to the fabrication of thin-film optical filters. Nonetheless, the generic techniques described herein for the measurement and control of thin-film growth are applicable to a wide variety of thin-film materials including semiconductor materials for electronic device fabrication.

The invention claimed is:

1. A method of determining the rate of change of optical thickness of a thin-film during deposition from a material source comprising the steps of illuminating the thin-film with electromagnetic radiation having a range of wavelengths, measuring the transmission spectrum of the thin-film to determine the wavelength $\lambda_t$ of a turning point in the transmission spectrum, wherein at least two measurements of the transmission spectrum of the thin-film are made during deposition, the at least two measurements are used to determine the rate of change of optical thickness of the thin-film as a function of time, and comprising the further step of controlling the thin-film deposition based upon the determined rate of change of optical thickness.

2. A method of controlling the growth of a thin-film comprising the steps of growing a thin-film onto a substrate, the thin-film having a turning point at wavelength $\lambda_d$ at its optical design thickness, determining the rate of change of optical thickness of the thin-film according to the method of claim 1, predicting a time T in the growth process at which the wavelength $\lambda_t$ of the turning point in the transmission spectrum of the thin-film will be substantially equal to the wavelength $\lambda_d$ of the thin-film at its optical design thickness, and interrupting the growth process such tat growth ceases at time T.

3. A method according to claim 2, including the further steps of:

measuring the transmission spectrum of the thin-film after the interruption in the growth process, determining the wavelength $\lambda_t$ of the turning point in the transmission spectrum for the grown thin-film, comparing the wavelength $\lambda_t$ of the turning point for the grown thin-film with the wavelength $\lambda_d$ of the turning point for the thin-film at its optical design thickness to provide an indication $\Delta\lambda$ of the error there-between, and compensating for $\Delta\lambda$ by controlling the growth of subsequent thin-film layers.

4. A method according to claim 1 wherein the step of determining the rate of change of optical thickness of the thin-film comprises the step of determining the rate of change of the wavelength $\lambda_t$ of the turning point in the transmission spectrum.

5. A method according to claim 1 wherein the material source comprises an ion-beam source.

6. A method according to claim 1 wherein the material source comprises evaporation means.

7. A method according to claim 1 wherein the material source comprises ion beam plating means.

8. A method according to claim 1 wherein the material source comprises sputtering means.

9. A method according to claim 1 wherein the electromagnetic radiation comprises broadband electromagnetic radiation and wherein the transmission spectrum of the thin-film is measured using a spectrometer.

10. A method according to claim 9 wherein the spectrometer comprises a grating spectrometer.

11. A method according to claim 9 wherein the broadband electromagnetic radiation is produced using at least one of an incandescent lamp and a filament.

12. A method according to claim 1 wherein the electromagnetic radiation comprises tuneable narrow-band electromagnetic radiation, at least part of the transmission spectrum of the thin-film is measured using an intensity detector, and further comprising the step of turning the narrow-band electromagnetic radiation through at least part of the transmission spectrum of the thin-film.

13. A method according to claim 1 wherein the electromagnetic radiation comprises wavelengths in the range of 400 nm to 1620 nm.

14. A method of determining the rate of change of optical thickness of a thin-film during deposition of material from a material source comprising the steps of
illuminating the thin-film with electromagnetic radiation having a range of wavelengths,
measuring the transmission spectrum of the thin-film to determine the wavelength $\lambda_t$ of a turning point in the transmission spectrum,
measuring a rate signal directly proportional to the rate of deposition of material and integrating said signal with respect to time,
measuring the integral of the rate signal at substantially the same time in the deposition process as the transmission spectrum of the thin-film is measured,
wherein at least two measurements of the transmission spectrum of the thin-film are made during deposition, the at least two measurements are used to determine the rate of change of optical thickness of the thin-film as a function of the integral of the rate signal, and comprising the further step of controlling the thin-film deposition based upon the determined rate of change of optical thickness.

15. A method of controlling the growth of a thin-film comprising the steps of
growing a thin-film onto a substrate, the thin-film having a turning point at wavelength $\lambda_d$ at its optical design thickness,
determining the rate of change of optical thickness of the thin-film according to the method of claim 2,
predicting a value for the integral of the rate signal at which the wavelength $\lambda_t$ of the turning point in the transmission spectrum of the thin-film will be substantially equal to the wavelength $\lambda_d$ of the thin-film at its optical design thickness, and
interrupting the growth process such that growth ceases at the point when the integral of the rate signal is equal to the predicted value.

16. A method according to claim 14 wherein the step of determining the rate of change of optical thickness of the thin-film comprises the step of determining the rate of change of the wavelength $\lambda_t$ of the turning point in the transmission spectrum.

17. A method according to claim 14 when the material source is selected from the group consisting of an ion-beam source, an evaporation means, an ion beam plating means, and a sputtering means.

18. A method of determining the rate of change of optical thickness of a thin-film during deposition from a material source comprising the steps of
illuminating the thin-film with electromagnetic radiation having a range of wavelengths,
measuring the transmission spectrum of the thin-film to determine the wavelength $\lambda_t$ of a turning point in the transmission spectrum,
measuring the cumulative energy supplied to the material source at substantially the same time in the deposition process as the transmission spectrum of the thin-film is measured,
wherein at least two measurements of the transmission spectrum of the thin-film are made during deposition, the at least two measurements are used to determine the rate of change of optical thickness of the thin-film as a function of the cumulative energy supplied, and comprising the further step of controlling the thin-film deposition based upon the determined rate of change of optical thickness.

19. A method according to claim 18 wherein the step of measuring the cumulative energy comprises the steps of monitoring the power consumed by the material source and integrating the power to determine the cumulative energy supplied to the material source.

20. A method of controlling the growth of a thin-film comprising the steps of
growing a thin-film onto a substrate, the thin-film having a turning point at wavelength $\lambda_d$ at its optical design thickness,
determining the rate of change of optical thickness of the thin-film according to the method of claim 18,
predicting the cumulative energy E in the growth process at which the wavelength $\lambda_t$ of the turning point in the transmission spectrum of the thin-film will be substantially equal to the wavelength $\lambda_d$ of the thin-film at its optical design thickness, and
interrupting the growth process such that growth ceases at the point when cumulative energy E has been supplied to the material source.

21. A method according to claim 20 and including the steps of:
measuring the transmission spectrum of the thin-film after the interruption in the growth process,
determining the wavelength $\lambda_t$ of the turning point in the transmission spectrum for the grown thin-film,
comparing the wavelength $\lambda_t$ of the turning point for the grown thin-film with the wavelength $\lambda_d$ of the turning point for the thin-film at its optical design thickness to provide an indication $\Delta\lambda$ of the error there-between, and
compensating for $\Delta\lambda$ by controlling the growth of subsequent thin-film layers.

22. A method according to claim 18 wherein the step of determining the rate of change of optical thickness of the thin-film comprises the step of determining the rate of change of the wavelength $\lambda_t$ of the turning point in the transmission spectrum.

23. A method according to claim 18 when the material source is selected from the group consisting of an ion-beam source, an evaporation means, an ion beam plating means, and a sputtering means.

24. A method of determining the rate of change of optical thickness of a thin-film during deposition from a material source comprising the steps of
illuminating the thin-film with electromagnetic radiation having a range of wavelengths,
measuring the transmission spectrum of the thin-film to determine the wavelength $\lambda_t$ of a turning point in the transmission spectrum,
measuring the cumulative charge supplied to the material source at substantially the same time in the deposition process as the transmission spectrum of the thin-film is measured,
wherein at least two measurements of the transmission spectrum of the thin-film are made during deposition, the at least two measurements are used to determine the rate of change of optical thickness of the thin-film as a function of the cumulative charge supplied, and comprising the further step of controlling the thin-film deposition based upon the determined rate of change of optical thickness.

25. A method according to claim 24 wherein the step of measuring the cumulative charge comprises the steps of monitoring the current consumed by the material source and integrating the current to determine the cumulative charge supplied to the material source.

26. A method of controlling the growth of a thin-film comprising the steps of
growing a thin-film onto a substrate, the thin-film having a turning point at wavelength $\lambda_d$ at its optical design thickness,
determining the rate of change of optical thickness of the thin-film according to the method of claim 24,
predicting the cumulative charge C in the growth process at which the wavelength $\lambda_t$ of the turning point in the transmission spectrum of the thin-film will be substantially equal to the wavelength $\lambda_d$ of the thin-film at its optical design thickness, and
interrupting the growth process such that growth ceases at the point when cumulative charge C has been supplied to the material source.

27. A method according to claim 26 and including the steps of:
measuring the transmission spectrum of the thin-film after the interruption in the growth process,
determining the wavelength $\lambda_t$ of the turning point in the transmission spectrum for the grown thin-film,
comparing the wavelength $\lambda_t$ of the turning point for the grown thin-film with the wavelength $\lambda_d$ of the turning point for the thin-film at its optical design thickness to provide an indication $\Delta\lambda$ of the error there-between, and
compensating for $\Delta\lambda$ by controlling the growth of subsequent thin-film layers.

28. A method according to claim 24 wherein the step of determining the rate of change of optical thickness of the thin-film comprises the step of determining the rate of change of the wavelength $\lambda_t$ of the turning point in the transmission spectrum.

29. A method according to claim 24 when the material source is selected from the group consisting of an ion-beam source, an evaporation means, an ion beam plating means, and a sputtering means.

30. Apparatus for determining the rate of change of optical thickness of a thin-film during deposition from a material source comprising
a source of electromagnetic radiation having a range of wavelengths
measuring means arranged to measure the transmission spectrum of the thin-film and configured to determine the wavelength $\lambda_t$ of a turning point in the transmission spectrum
means for determining the rate of change of optical thickness of the thin-film as a function of time from at least two measurements of the transmission spectrum of the thin-film during deposition.

31. Apparatus for controlling the growth of a thin-film on a substrate, the thin-film having a turning point at wavelength $\lambda_d$ at its optical design thickness, comprising
means for determining the rate of change of optical thickness of thin-film according to claim 30,
means for predicting a time T in the growth process at which the wavelength $\lambda_t$ of the turning point in the transmission spectrum of thin-film will be substantially equal to the wavelength $\lambda_d$ of the thin-film at its optical design thickness, and
means for interrupting the growth process such that growth ceases at time T.

32. Apparatus according to claim 30 wherein the means for determining the rate of change of optical thickness of the thin-film comprises means for determining the rate of change of the wavelength $\lambda_t$ of the turning point in the transmission spectrum.

33. Apparatus according to claim 30 wherein the source of electromagnetic radiation comprises a broadband source of electromagnetic radiation and wherein the measuring means for measuring the transmission spectrum of the thin-film comprises a spectrometer.

34. Apparatus according to claim 33 wherein the spectrometer comprises a grating spectrometer.

35. Apparatus according to claim 33 wherein the source of electromagnetic radiation comprises at least one of an incandescent lamp and a filament.

36. Apparatus according to claim 30 wherein the source of electromagnetic radiation comprises a narrow-band source of electromagnetic radiation tuneable through at least part of the transmission spectrum of the thin-film, and the measuring means for measuring the transmission spectrum of the thin-film comprises an intensity detector.

37. Apparatus according to claim 30 wherein the source of electromagnetic radiation is arranged to emit electromagnetic radiation at wavelengths in the range of 400 nm to 1620 nm.

38. Apparatus according to claim 30 when the material source is selected from the group consisting of an ion-beam source, an evaporation means, an ion beam plating means, and a sputtering means.

39. Apparatus for determining the rate of change of optical thickness of a thin-film during deposition of material from a material source comprising
a source of electromagnetic radiation having a range of wavelengths
measuring means arranged to measure the transmission spectrum of the thin-film and configured to determine the wavelength $\lambda_t$ of a turning point in the transmission spectrum
means for measuring a rate signal directly proportional to the rate of deposition of material and means for integrating said rate signal with respect to time,
means for measuring the integral of the rate signal at substantially the same time in the deposition process as the transmission spectrum of the thin-film is measured,
means for determining the rate of change of optical thickness of the thin-film, as a function of the integral of the rate signal, from at least two measurements of the transmission spectrum of the thin-film during deposition.

40. Apparatus for controlling the growth of a thin-film on a substrate, the thin-film having a turning point at wavelength $\lambda_d$ at its optical design thickness, comprising
means for determining the rate of change of optical thickness of the thin-film according to the apparatus of claim 39,
means for predicting a value for the integral of the rate signal at which the wavelength $\lambda_t$ of the turning point in the transmission spectrum of thin-film will be substantially equal to the wavelength $\lambda_d$ of the thin-film at its optical design thickness, and
means for interrupting the growth process such that growth ceases at the point when the integral of the rate signal is equal to the predicted value.

41. Apparatus according to claim 39 when the material source is selected from the group consisting of an ion-beam source, an evaporation means, an ion beam plating means, and a sputtering means.

42. Apparatus according to claim 39 wherein the means for determining the rate of change of optical thickness of the thin-film comprises means for determining the rate of change of the wavelength $\lambda_t$ the turning point in the transmission spectrum.

43. Apparatus according to claim 39 wherein the source of electromagnetic radiation comprises a broadband source of electromagnetic radiation and wherein the measuring means for measuring the transmission spectrum of the thin-film comprises a spectrometer.

44. Apparatus according to claim 39 wherein the source of electromagnetic radiation comprises a narrow-band source of electromagnetic radiation tuneable through at least part of the transmission spectrum of the thin-film, and the measuring means for measuring the transmission spectrum of the thin-film comprises and intensity detector.

45. Apparatus according to claim 39 wherein the source of electromagnetic radiation is arranged to emit electromagnetic radiation at wavelengths in the range of 400 nm to 1620 nm.

46. Apparatus for determining the rate of change of optical thickness of thin-film during deposition from a material source comprising a source of electromagnetic radiation having a range of wavelengths, measuring means arranged to measure the transmission spectrum of thin-film and configured to determine the wavelength $\lambda_t$ of a turning point in the transmission spectrum, means for measuring the cumulative energy supplied to the material source at substantially the same time in the deposition process as the transmission spectrum of the thin-film is measured, means for determining the rate of change of optical thickness of the thin-film, as a function of the cumulative energy supplied to the material source, from at least two measurements of the transmission spectrum of the thin-film during deposition.

47. Apparatus according to claim 46 wherein the means for measuring the cumulative energy supplied to the material source comprises means for monitoring the power consumed by the material source and means for integrating the power to determine the cumulative energy supplied to the material source.

48. Apparatus for controlling the growth of a thin-film on a substrate, the thin-film having a turning point at wavelength $\lambda_d$ at its optical design thickness, comprising means for determining the rate of change of optical thickness of the thin-film according to the apparatus of claim 46, means for predicting the cumulative energy E in the growth process at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at the point when cumulative energy E has been supplied to the material source.

49. Apparatus according to claim 46 when the material source is selected from the group consisting of an ion-beam source, an evaporation means, an ion beam plating means, and a sputtering means.

50. Apparatus according to claim 46 wherein the means for determining the rate of change of optical thickness of the thin-film comprises means for determining the rate of change of the wavelength $\lambda_t$ of the turning point in the transmission spectrum.

51. Apparatus according to claim 46 wherein the source of electromagnetic radiation comprises a broadband source of electromagnetic radiation and wherein the measuring means for measuring the transmission spectrum of the thin-film comprises a spectrometer.

52. Apparatus according to claim 46 wherein the source of electromagnetic radiation comprises a narrow-band source of electromagnetic radiation tuneable through at least part of the transmission spectrum of the thin-film, and the measuring means for measuring the transmission spectrum of the thin-film comprises and intensity detector.

53. Apparatus according to claim 46 wherein the source of electromagnetic radiation is arranged to emit electromagnetic radiation at wavelengths in the range of 400 nm to 1620 mn.

54. Apparatus for determining the rate of change of optical thickness of a thin-film during deposition from a material source comprising a source of electromagnetic radiation having a range of wavelengths, measuring means arranged to measure the transmission spectrum of the thin-film and configured to determine the wavelength $\lambda_t$ of a turning point in the transmission spectrum, means for measuring the cumulative charge supplied to the material source at substantially the same time in the deposition process as the transmission spectrum of the thin-film is measured, means for determining the rate of change of optical thickness of the thin-fun, as a function of the cumulative charge supplied to the material source, from at least two measurements of the transmission spectrum of the thin-film during deposition.

55. Apparatus according to claim 54 wherein the means for measuring the cumulative charge supplied to the material source comprises means for monitoring the current consumed by the material source and means for integrating the current to determine the cumulative charge supplied to the material source.

56. A method according to claim 55 when the material source is selected from the group consisting of an ion-beam source, an evaporation means, an ion beam plating means, and a sputtering means.

57. Apparatus for controlling the growth of a thin-film on a substrate, the thin-film having a turning point at wavelength $\lambda_d$ at its optical design thickness, comprising, means for determining the rate of change of optical thickness of the thin-film according to the apparatus of claim 54, means for predicting the cumulative charge C in the growth process at which the wavelength $\lambda_t$ of the turning point in the transmission spectrum of thin-film will be substantially equal to the wavelength $\lambda_d$ of the thin-film at its optical design thickness, and means for interrupting the growth process such that growth ceases at the point when cumulative charge C has been supplied to the material source.

58. Apparatus according to claim 54 wherein the means for determining the rate of change of optical thickness of the thin-film comprises means for determining the rate of change of the wavelength $\lambda_t$ of the turning point in the transmission spectrum.

59. Apparatus according to claim 54 wherein the source of electromagnetic radiation comprises a broadband source of electromagnetic radiation and wherein the measuring means for measuring the transmission spectrum of the thin-film comprises a spectrometer.

60. Apparatus according to claim 54 wherein the source of electromagnetic radiation comprises a narrow-band source of electromagnetic radiation tuneable through at least part of the transmission spectrum of the thin-film, and the measuring means for measuring the transmission spectrum of the thin-film comprises and intensity detector.

61. Apparatus according to claim 54 wherein the source of electromagnetic radiation is arranged to emit electromagnetic radiation at wavelengths in the range of 400 nm to 1620 nm.

* * * * *